Figure 1:
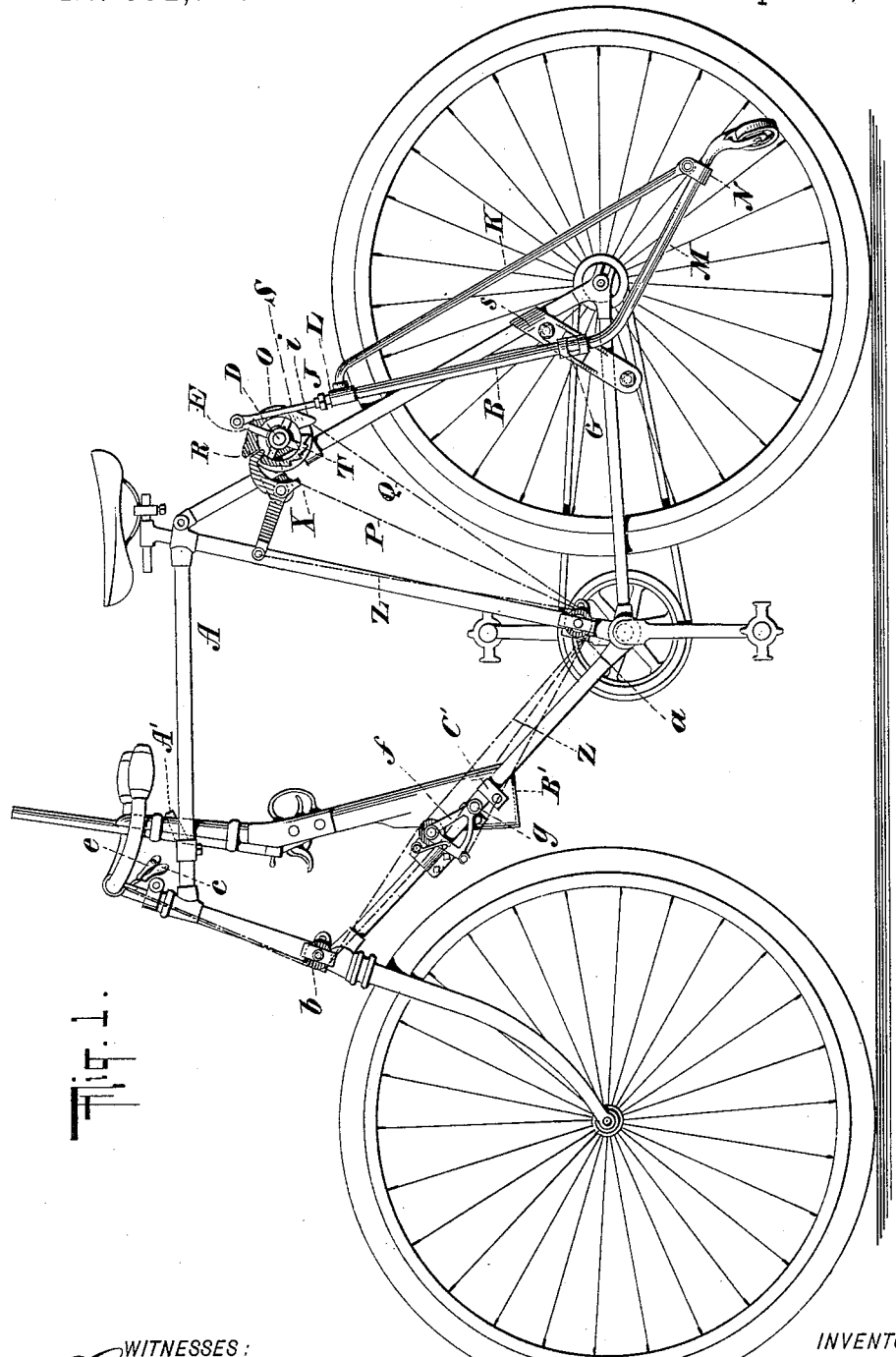

(No Model.) 4 Sheets—Sheet 1.

E. A. TRAPP.
BICYCLE SUPPORT.

No. 602,784. Patented Apr. 19, 1898.

WITNESSES:
Gustave Dieterich
John Kihlenbeck

INVENTOR
Edward A. Trapp,
BY
Chas. C. Gill
ATTORNEY

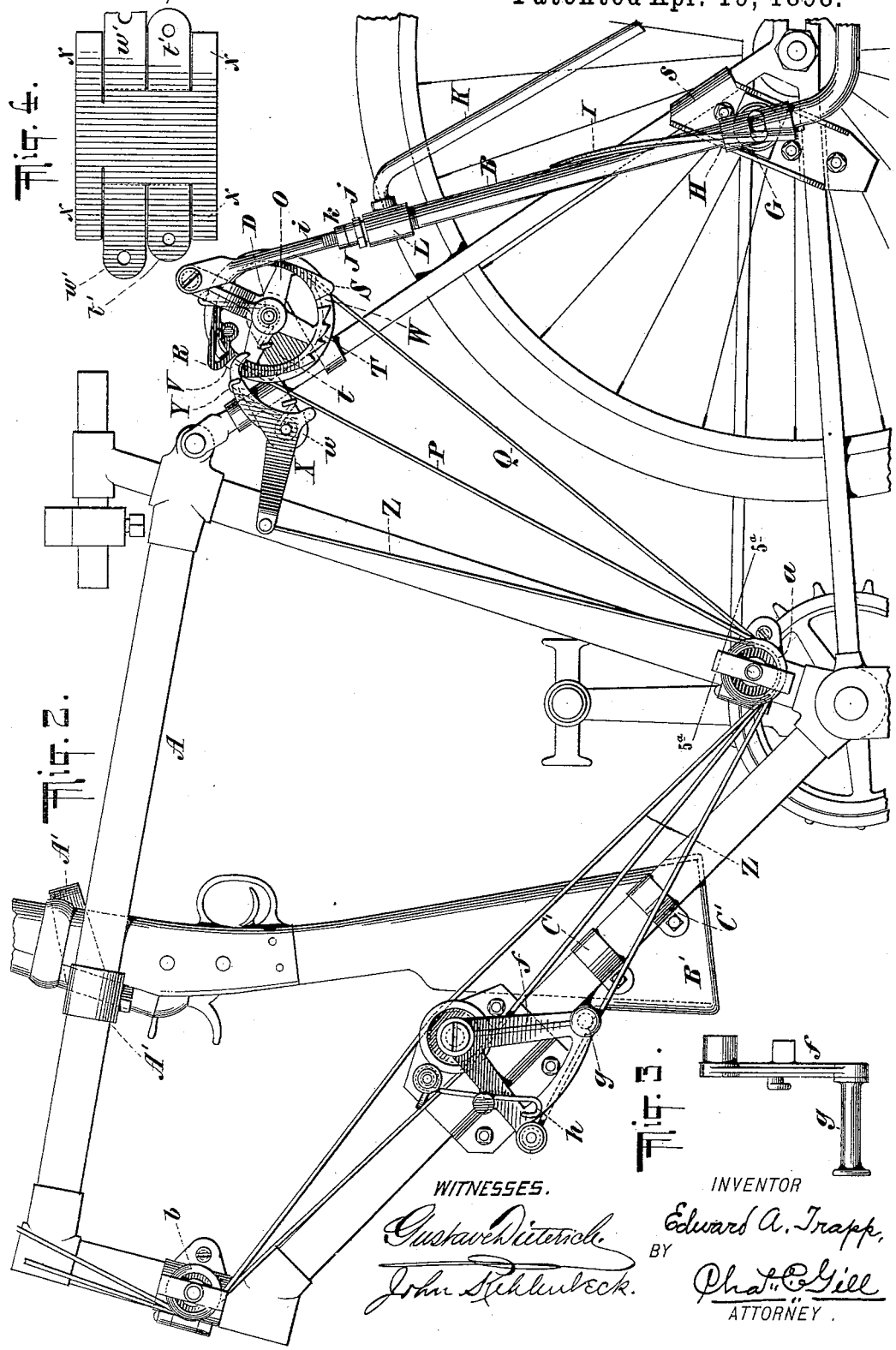

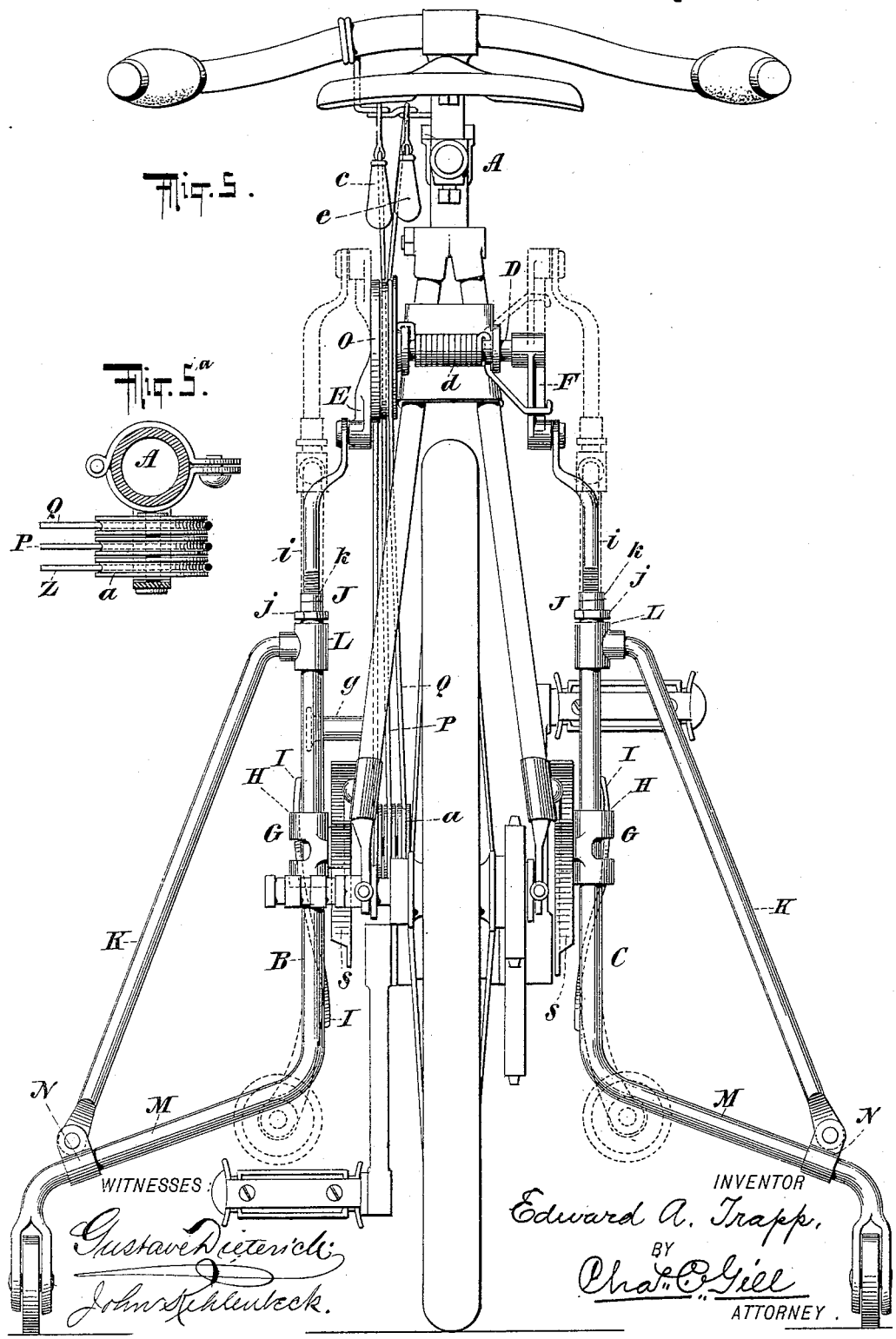

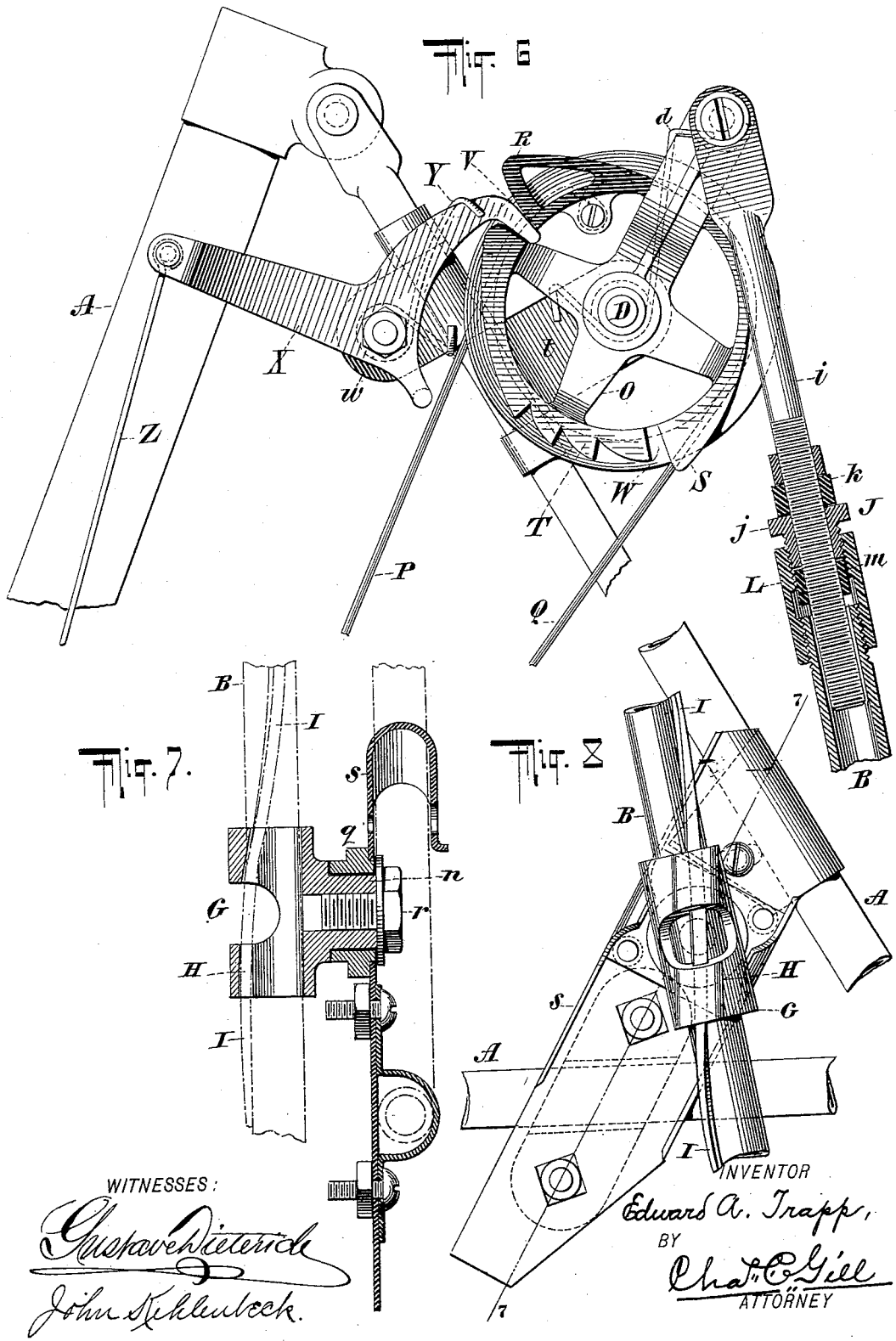

UNITED STATES PATENT OFFICE.

EDWARD A. TRAPP, OF NEW YORK, N. Y.

BICYCLE-SUPPORT.

SPECIFICATION forming part of Letters Patent No. 602,784, dated April 19, 1898.

Application filed August 6, 1897. Serial No. 647,294. (No model.)

*To all whom it may concern:*

Be it known that I, EDWARD A. TRAPP, a citizen of the United States, residing at New York, in the county of New York and State of New York, have invented certain new and useful Improvements in Bicycles; and I do declare the following to be a full, clear, and exact description of the invention, such as will enable others skilled in the art to which it appertains to make and use the same, reference being had to the accompanying drawings, and to the letters of reference marked thereon, which form a part of this specification.

The invention relates to improvements in bicycles and analogous vehicles, and pertains particularly to means for supporting the wheel while at rest in a vertical position.

The invention consists in the novel features and combinations hereinafter described, and particularly pointed out in the claims.

One of the main objects accomplished by my invention is that it enables the rider while seated upon the saddle to come to a full stop in the middle of the road or elsewhere without alighting from the wheel, the mechanism connected with the supporting-rods and the supporting-rods themselves being such that the rider without dismounting may maintain the wheel in its upright position while at rest any desired length of time and without danger of the wheel being thrown over sidewise by any movement he might make while remaining upon the saddle.

The invention will be fully understood from the detailed description hereinafter presented, reference being had to the accompanying drawings, in which—

Figure 1 is a side elevation of a bicycle of the usual type provided with the mechanism constituting the present invention, the supporting-rods in this figure being shown in their elevated position. Fig. 2 is an enlarged side elevation of a portion of the bicycle and illustrates, on an enlarged scale, the mechanism constituting the present invention. Fig. 3 is a detached view of a bell-crank forming one of the details of the mechanism. Fig. 4 is a plan view of a blank which is bent to form supporting-brackets for the crank-shaft and locking-dog which form a part of the mechanism embraced in the present invention. Fig. 5 is an end view of a bicycle employing the devices of the present invention, the supporting-rods being shown in their lower position by full lines and in their upper position by dotted lines. Fig. 5ª is a detached section on the dotted line 5ª 5ª of Fig. 2. Fig. 6 is a detached enlarged view of the means for elevating the supporting-rods and also for locking said rods in their upper and lower positions. Fig. 7 is a central vertical section through the swivel and connected parts, said swivel receiving the supporting-rods and compelling the latter to have an axial motion during their upward and downward movements, said section being on the dotted line 7 7 of Fig. 8; and Fig. 8 is a side elevation of same.

In the drawings, A designates a safety-bicycle of the usual type, and so far as the present invention is concerned said bicycle may be either of the pattern designed for men or that more especially adapted for women. The bicycle proper is not claimed herein, and hence it may vary in construction as desired without affecting the present invention, which comprises means adapted for attachment to all forms and makes of bicycles.

The supporting-rods by which the bicycle may be maintained in a vertical position while at rest are lettered B C, and said rods correspond exactly with one another and are operated as to their vertical movements from the crank-shaft D, to the ends of which said rods are connected by means of the cranks E F, respectively, as more clearly indicated in Fig. 5. The rods B C extend downward and rearward from said crank-shaft D, and their lower portions are bent outward and downward, as clearly illustrated in Fig. 5, and are provided with the rollers, as shown. The rods B C have their main body portion held under restraint by the swiveled sleeves G, which are provided, as indicated in Figs. 7 and 8, with the grooves H to engage the spiral feather I upon said rods B C, and thereby during the vertical motions of said rods B C to effect an axial movement to the same, whereby during the downward movement of said rods B C their lower bent ends will be turned outward to the position in which they are shown by full lines in Fig. 5, and during the upward motion of said rods said lower bent ends will be turned inward close to the rear wheel of the bicycle, as indicated by dotted lines in Fig. 5 and full lines in Fig. 1. Adjacent to the upper ends of the rods B C is formed the swivel connection J, as shown on an enlarged scale in Fig. 6, in order that said rods B C may throughout the greater extent of their length have the axial motion above described without hindrance from their connection with the cranks E F. The construction of the swivel G and swivel connection J will be hereinafter fully explained in an appropriate place.

The supporting-rods B C are each provided with the brace K, which extends downward from the sleeve L to the outer end of the bent lower portion M of said rods B C, and the lower ends of said braces K are secured to said portions M by means of the bands N, which pass around the circumference of the rods B C and have their ends brought toward one another to form ears located at opposite sides of the lower ends of the braces K, and between which ears said braces K are at their lower ends secured. The upper ends of the braces K will preferably enter a socket formed upon the side of the sleeve L. The crank-shaft D has upon one end the wheel O, which is grooved to receive the cords or chains lettered P Q and hereinafter fully described, and is also provided at one edge with the stops R S, the ratchet-teeth T, and recesses V W, as more clearly illustrated in Figs. 2 and 6. The wheel O is utilized as the medium through which by means of the cords or chains P Q the shaft D may be operated; but more particularly the wheel O is employed in connection with the locking-dog X, which is in the form of a bell-crank lever and is given a spring-tension at its engaging end toward the wheel O. The purpose of the recesses V W in the wheel O is to enable the locking-dog X to lock the shaft D, and thereby secure the supporting-rods B C when the latter are in their lower position and also when they are in their upper position.

In Fig. 6 the locking-dog X is illustrated as locking the supporting-rods B C in their upper position, and in this figure it will be observed that the engaging end of the dog X is within the recess V of the wheel O. Upon the downward movement of the supporting-rods B C (the dog X having been relieved from the wheel O manually) the recess W will assume the position at present occupied in Fig. 6 by the recess V, and upon arriving at said position the engaging end of the dog X will spring into said recess W and thereby lock said wheel O and shaft D against movement, thus securing the rods B C when the latter are in their lower position. When the locking-dog X is relieved from the wheel O and the supporting-rods B C are again elevated to the position shown in Fig. 6, the recess W will return downward to its lower position shown and the locking-dog X will again engage the recess V and lock the rods B C in their upper position.

The stops R S on the wheel O coöperate with the bent engaging end of the locking-dog X to check the motion of the wheel O at the ends of its proper movement. Thus during the upward motion of the supporting-rods B C the stop R will contact with the bent end of the dog X, as shown in Fig. 6, and when the supporting-rods B C are lowered the stop S will contact with the bent end of the dog X. The ratchet-teeth T on the wheel O will be engaged by the bent end of the locking-dog X when the supporting-rods B C have been lowered; but, due to an excessive weight upon the saddle or to a want of sufficient air in the tires, said rods are unable to reach their extreme lower position. The distance between the crank-shaft D and the ground will vary somewhat in accordance with the condition of the tires and the weight of the rider, and under all normal conditions the recesses V W for the dog X will be all that will be required as a means for locking the rods B C in their upper and lower positions, and under such normal conditions when the rods B C are in their extreme lower position the recess W will be in direct alinement with the pointed end of the dog X. When, however, due, for instance, to an excessive weight being on the saddle and a consequent flattening of the tires against the ground, the distance between the crank-shaft D and the ground has been lessened, so that the rods B C, while reaching the ground when lowered, are prevented from having their full extent of maximum movement, the recess W will not reach the point of the dog X, and at such time said dog X will engage one of the teeth T and thereby lock the supporting-rods B C in the lower position they have assumed. Upon the removal of the excessive weight from the saddle the distance between the crank-shaft D and the ground will increase owing to the expansion of the tire, and at such time upon the lowering of the rods B C the recess W will reach and be engaged by the bent end of the dog X. The dog X is given a spring-tension toward the wheel O by means of the wire spring Y or other suitable spring, and, as above described, the said dog X is freed from the wheel O by the manual action of the rider in pulling on the cord Z, which, as illustrated in Figs. 1, 2, and 5 more particularly, extends downward below the roller a, and thence passes upward over the roller b, and is provided adjacent to the handle-bar with a handle c, the latter being in convenient position for the rider to grasp. By pulling upon the handle c the rider will be enabled, through the medium of the cord Z, to pull downward upon the shank end of the dog X and in that manner relieve the pointed end of said dog from the wheel O, the latter being thus released and in condition to turn downward with the shaft D for the purpose of lowering the rods B C or to be pulled upward by the means hereinafter described and thus elevate the rods B C. When the dog X is thus relieved from the wheel O, and at such time the supporting-rods B C are in their upper position, the weight of said rods, coupled with the action of the spring D on said crank-shaft D, (see Fig. 5,) will cause said rods to descend to their lower position and in doing so turn the wheel O and crank-shaft D, so that the recess W or teeth T may be engaged by the dog X. The descent of the rods B C may thus be accomplished by simply freeing the dog X from the wheel O, and during their descent said rods B C are given their axial motion to throw their lower bent ends M outward by means of the swivel G and the spiral feather I, the latter being on said rods B C and engaged by the groove H in said swivels G.

If for any reason the rods B C should not reach entirely to their lower position, said rods may be forced downward by means of the cord or chain Q, connected with one side of said wheel O, as shown in Figs. 2 and 6, and thence extending downward along the grooved wheel $a$ and upward around the grooved wheel $b$ and provided at its end with a convenient handle $e$. The rider by pulling on the handle $e$ may thus force the wheel O and shaft D to continue their movement and in that manner drive the supporting-rods B C fully downward. The cord Q is employed simply as an expedient to insure at all times and under all conditions the full downward movement of the rods B C consistent with the weight upon the saddle or the condition of the pneumatic tires. The upward movement of the rods B C is effected by the action of the rider upon the bell-crank lever or treadle $f$, to which one end of the cord or chain P is secured, the other end of said cord or chain being secured to the wheel O at the side of the latter opposite to that at which the cord Q is secured. The cords P Q are at opposite sides of the wheel O in order that the cord Q may be used to turn the wheel O and shaft D in one direction and the cord or chain P to turn said wheel O and shaft D in the opposite direction, the effect of the cord or chain Q being to drive the bars B C downward, while the effect of the cord or chain P is to pull said rods B C upward.

As above described, the cord Q is operated by the hand of the rider, and the cord P, being connected with a foot-treadle $f$, will be operated by the foot of the rider, the said treadle or bell-crank lever $f$ being provided with the bar $g$, as clearly shown in Fig. 3. The bell-crank lever $f$ is pivoted to a bracket secured to the lower front fork of the bicycle-frame, as clearly illustrated in Fig. 2, and said bell-crank lever or foot-treadle $f$ is given a spring-tension forward by means of the wire spring $h$ in order that there may be a suitable tension upon the cord or chain P sufficient to maintain the latter taut or free from slackness. When it is desired to elevate the rods B C by means of the foot-treadle or bell-crank lever $f$, the rider will first pull upon the handle $c$ and cord Z to free the dog X from the wheel O, and thereupon the rider will immediately press upon the foot-bar $g$ of the said treadle or bell-crank lever $f$ in order to rock said foot-treadle or lever forward, and thereby draw on the cord or chain P and revolve the wheel O and shaft D in a direction to elevate the cranks E F and through them the supporting-rods B C.

During the upward movement of the rods B C, due to the pressure of the foot of the rider upon the treadle or bell-crank lever $f$, the swivels G, coöperating with the spiral feathers I, will turn said rods inward to the position in which they are shown by dotted lines in Fig. 5 and full lines in Fig. 1.

When the bicycle is in its normal condition for use, the supporting-rods B C will be in their upper position, and the locking-dog X will engage the recess V of the wheel O, thereby locking the shaft D and maintaining said rods B C in their upper position. When it is desired to stop the wheel without dismounting, the rider will simply pull on the handle $c$ to release the dog X from the recess V, and thereupon the weight of the rods B C, combined with the force of the spring $d$, will drive the rods B C to their lower position, while at the same time the swivels G will operate to axially turn the rods B C outward to the position in which they are illustrated in Fig. 5. The downward movement of the rods B C may be assisted, if found necessary, by means of the cord Q and handle $e$. When the rods B C are in their lower position, they will be there locked by means of the dog X engaging either the recess W or one of the teeth T of the wheel O. The rods B C having thus been given their lower position and there locked they will support the bicycle as long as the rider may wish the same to remain at rest and in an entirely efficient and safe manner, and when it is desired to proceed the rider will simply pull on the handle $c$ to free the dog X from the wheel O and at once press with his foot upon the treadle or bell-crank lever $f$, thereby causing the cord or chain P to operate the wheel O and shaft D and through the cranks E F elevate the rods B C to their full upward position, (shown in Fig. 6,) in which position they will be locked by the engagement of the dog X in the recess V of the wheel O.

The general construction and operation of the mechanism constituting the present invention have been fully described above; but there are several details of construction which are of importance and novel, and they constitute a portion of the invention claimed herein. These details will now be described, and they pertain particularly to the supporting-rods B C, swivels G, and the brackets for supporting the crank-shaft D and dog X.

The supporting-rods B C are formed throughout of tubing. The braces K are simply tubes flattened at their lower ends and at their upper ends engaging the hubs upon the sides of the sleeves L, as clearly shown in Fig. 5. The main body of the rods B C are simply tubes whose lower ends are bent into shape and then split at their extremities to receive the wheels or rollers, as illustrated in Fig. 5, and at their upper ends the main body of the rods B C are within the said sleeves L and receive the lower threaded ends of the upper sections $i$ of said rods B C, said sections $i$ being formed of tubes whose upper ends are flattened and are pivotally secured to the ends of the cranks E F. The sleeves L are threaded to engage exterior threads upon the upper ends of the main body portion of the rods B C, as shown in Fig. 6, and also to receive the sleeve $j$, which has a smooth bore and is upon the upper sections $i$ and between the nuts $k$ $m$, which retain said sleeve $j$ in a fixed position, but permit of its being adjusted whenever desired. The sleeve $j$ and nuts $k$ $m$ form a swivel, which permits the main body portions of the rods B C to have their axial motion. During the axial motion of the rods B C the sleeve $j$ will turn with the sleeve L and said rods B C, while the upper sections $i$ will have no axial motion, but will not be twisted or prejudicially affected by the turning of the rods B C. The construction of the swivel connection intermediate the main body portion and the upper sections $i$ of the rods B C also permits of the lengthening and shortening of said rods B C to suit varied conditions. For instance, if it should be desired to shorten the rods B C to suit particular conditions the nuts $k$ $m$ may be moved upward upon the said upper sections $i$, and thus the swivel-sleeve $j$ may be elevated and the lower ends of the said upper sections $i$ caused to project farther into the tubular portion of the rods B C. The rods B C may be lengthened by moving the nuts $k$ $m$ and sleeve $j$ downward upon the upper sections $i$ of said rods B C. The rods B C being of tubing are both light, strong, and inexpensive, and being of the form illustrated in Fig. 5 they are particularly durable and efficient. The main portion of the rods B C, as illustrated in Fig. 5, are in the form of triangles and capable of withstanding any reasonable amount of pressure or hard usage.

The swivels G are in the form of sleeves having the groove or recess H above described and also having a central hub $n$, which is adapted to turn within the collar $q$ and receives the bolt $r$, by which the swivel is held in place and permitted to have a pivotal motion under the action of the moving rods B C. The swivel G turns within the collar $q$, which is stationary, and the latter and said swivel are supported from the frame of the bicycle by means of the bracket $s$, (shown enlarged in Figs. 7 and 8,) and which bracket is, as illustrated, applicable to the ordinary type of bicycle and when applied will connect the upper and lower members of the rear portion of the frame of the bicycle.

The crank-shaft D and dog X are supported in the brackets lettered $t$ $w$, respectively, as clearly shown in Figs. 2 and 6, and which brackets are formed from a blank of sheet metal of the outline illustrated in Fig. 4. The middle portion of the blank illustrated in Fig. 4 is placed against the rear member of the bicycle-frame and is there secured by the wrapping of the ends $x$ around said member, and the brackets $t$ $w$ are formed by turning the ears $t'$ upward and rearward to receive the crank-shaft D and by turning the ears $w'$ downward to receive the bolt or pivot of the dog X, the one bracket thus furnishing the bearings for the shaft D and the pin or axle of the dog X.

It is shown in the drawings that the bicycle is provided with means by which it is adapted to support a gun, and to this end the frame of the bicycle at suitable points is provided with the spring-clip A' to retain the upper portion of the gun and with the socket B' to receive the stock end of the gun and firmly hold the same while at the same time permitting of a quick removal of the gun therefrom when desired. The socket B' is formed along its upper edge on a line corresponding with the lower front fork of the bicycle-frame and at its upper edge is provided with the ears C', which are wrapped around said fork and secure the socket B' in place. The socket B' is entirely open at its upper end, and the outline of the interior of said socket will correspond with the general outline of the stock end of the gun. The clip A' is secured at one end of the bicycle-frame, as shown in Fig. 2, and at the other end extends outward and then inward to grasp the upper portion of the gun when the latter is forced between it and the frame of the bicycle, as indicated in Fig. 2.

What I claim as my invention, and desire to secure by Letters Patent, is—

1. In a bicycle, a pair of supporting-rods extending downward and rearward one on each side of the rear wheel, and having the elongated spiral feathers I and the sleeves G having the spiral grooves H and swiveled to the frame of the bicycle at opposite sides of the latter and receiving and controlling said rods both during their vertical movement and oscillatory motion along the sides of said rear wheel, combined with the crank-shaft operable by the rider and journaled below the bicycle-saddle and adjacent to the top of the forward portion of said rear wheel, crank connections intermediate said shaft and the upper ends of said rods for operating the latter from said shaft, and locking devices connected with said shaft and under the control of the rider for maintaining said rods in their upper and lower positions; substantially as set forth.

2. In combination with the bicycle, the supporting-rods extending downward one on each side of the bicycle, the crank-shaft to which said rods are connected for operating said rods, the lever operatively connected with said shaft for effecting the elevation of said rods, the recessed locking-wheel connected with said shaft, and the locking-dog engaging said wheel; substantially as set forth.

3. In combination with the bicycle, the supporting-rods extending downward one on each side of the bicycle, the crank-shaft to which said rods are connected for operating said rods, the lever operatively connected with said shaft for effecting the elevation of said rods, the recessed locking-wheel connected with said shaft and having the ratchet-teeth, and the locking-dog adapted to engage either the recesses or teeth of said wheel and lock said rods in their upper and lower positions; substantially as set forth.

4. In combination with the bicycle, the supporting-rods extending downward one on each side of the bicycle, the crank-shaft to which said rods are connected for operating said rods, the lever operatively connected with said shaft for effecting the elevation of said rods, the recessed locking-wheel connected with said shaft and having the stops adjacent to its recesses, and the locking-dog adapted to engage the recesses of said wheel and to contact with said stops; substantially as set forth.

5. In a bicycle, the pair of supporting-rods, the crank-shaft to which the upper ends of said rods are connected, the recessed wheel on said shaft, and the locking-dog adapted to engage said wheel, combined with the bracket applied to the upper rear fork of the bicycle-frame and having the forwardly and rearwardly extending ears to form the bearings for said locking-dog and said crank-shaft; substantially as set forth.

6. In combination with the bicycle, the supporting-rods extending downward one on each side of the bicycle, and means for raising and lowering said rods and turning the same axially, said rods each having the tubular body portion, the upper threaded section freely entering said body portion, the sleeve revoluble on said upper section and engaging the sleeve upon the upper end of said body portion, and the nuts on said upper section at the upper and lower ends of said sleeve revoluble thereon; substantially as set forth.

7. In combination with the bicycle, the supporting-rods extending downward one on each side of the bicycle, the crank-shaft to which said rods are connected for operating said rods, the sleeves swiveled to the frame of the bicycle and receiving and controlling said rods both during their vertical movement and oscillatory motion along the sides of the bicycle, the wheel on said crank-shaft, the foot-treadle lever $f$ pivotally secured to the lower front portion of the bicycle-frame and connected with said wheel on said crank-shaft for elevating said rods, and locking devices connected with said shaft for maintaining said rods in their upper and lower positions; substantially as and for the purposes set forth.

8. In a bicycle of the "safety" type, the supporting-rods having the bent lower ends and extending downward on opposite sides of the rear wheel from a point in rear of the saddle-post and adjacent to the top of the forward portion of said rear wheel, and the sleeves swiveled to the rear portion of the bicycle-frame, said sleeves receiving and guiding said rods during their vertical and axial movements and turning with said rods during their oscillating movement along the sides of said rear wheel, combined with the crank-shaft journaled adjacent to the upper ends of said rods and over said rear wheel and below the saddle, the cranks rigid with said shaft and pivotally connected with the upper ends of said rods for operating the latter from said shaft, swivels in said rods above said sleeves and below said cranks for permitting said rods to turn axially, the foot-treadle operatively connected with said shaft for turning the latter and thereby through said cranks elevating said rods when pressure is applied on said treadle, the spiral on said swiveled sleeves for turning said rods axially during their vertical movements, and an automatic latch mechanism for locking said rods in their upward position, the relation of the parts being such that upon the release of said latch said rods will automatically descend; substantially as set forth.

In testimony whereof I affix my signature in presence of two witnesses.

EDWARD A. TRAPP.

Witnesses:
CHAS. C. GILL,
EDWIN T. COLLINS.